United States Patent
Nguyen

(10) Patent No.: US 7,441,435 B2
(45) Date of Patent: Oct. 28, 2008

(54) APPARATUS AND METHOD FOR AUTOMATIC SWAGING OF TUBES

(75) Inventor: Thomas Tuan Nguyen, Walnut, CA (US)

(73) Assignee: Western Tube & Conduit Corporation, Long Beach, CA (US)

( * ) Notice: Subject to any disclaimer, the term of this patent is extended or adjusted under 35 U.S.C. 154(b) by 0 days.

(21) Appl. No.: 11/607,722

(22) Filed: Dec. 1, 2006

(65) Prior Publication Data

US 2008/0127708 A1 Jun. 5, 2008

(51) Int. Cl.
*B21D 43/10* (2006.01)

(52) U.S. Cl. .............................. 72/422; 72/311; 72/361; 72/420

(58) Field of Classification Search ............... 72/76, 72/125, 296, 311, 312, 316, 317, 419, 420, 72/421, 422, 424, 428, 361
See application file for complete search history.

(56) References Cited

U.S. PATENT DOCUMENTS

| | | |
|---|---|---|
| 468,272 A | 2/1892 | Watt |
| 1,871,077 A | 8/1932 | Mowat |
| 2,210,531 A | 8/1940 | Engelbaug et al. |
| 2,441,925 A | 5/1948 | Wege |
| 2,749,782 A * | 6/1956 | Edgecombe et al. .......... 72/19.4 |
| 2,849,907 A | 9/1958 | Moosman |
| 2,902,139 A | 9/1959 | Brank et al. |
| 3,128,817 A | 4/1964 | Shaver |
| 3,228,228 A * | 1/1966 | Myotte ......................... 72/402 |
| 3,838,591 A | 10/1974 | Ross |
| 3,959,998 A | 6/1976 | Ross |
| 4,102,173 A | 7/1978 | Saloom |
| 4,157,026 A * | 6/1979 | Kralowetz et al. ............. 72/401 |
| 4,457,153 A * | 7/1984 | Russell ......................... 72/125 |
| 4,505,144 A * | 3/1985 | Sakuma et al. ................. 72/345 |
| 4,516,307 A | 5/1985 | Beard et al. |
| 4,667,548 A | 5/1987 | Astle et al. |
| 4,804,077 A | 2/1989 | John, Jr. |
| 5,060,500 A | 10/1991 | Ohneda et al. |
| 5,313,505 A | 5/1994 | Salvesen |
| 5,395,101 A | 3/1995 | Takimoto et al. |
| 6,179,279 B1 | 1/2001 | Asai et al. |

* cited by examiner

*Primary Examiner*—Edward Tolan
(74) *Attorney, Agent, or Firm*—Foley & Lardner LLP

(57) ABSTRACT

An automatic swaging machine including a conveyor system for moving tubes into position for swaging a clamping apparatus to secure the tubes adjacent a swaging station to receive a swaging tool releasing a clamping apparatus during the swaging operation, reclamping the tools after swaging to remove the swaging tool from the ends of the tubes and moving the tubes with the conveyor system into a receiving receptacle.

14 Claims, 10 Drawing Sheets

APPARATUS AND METHOD FOR AUTOMATIC SWAGING OF TUBES

FIELD OF THE INVENTION

The present invention is directed generally to swaging and more particularly to a method and apparatus for automatically continuously moving a plurality of pipes or tubes along a conveyor, performing a swaging operation on the ends thereof and then moving the pipes or tubes into a collecting receptacle.

BACKGROUND OF THE INVENTION

It is well known in the art that tubes or pipes (hereinafter tubes) constructed of metal are useful for a large variety of applications. In many instances, the ends of the tubes must be preformed for a particular application for which they are intended. Swaging operations to accomplish this preforming on the ends of tubes are well known. Typically, such swaging operations are accomplished manually, one piece at a time, by having a worker grip the tube and insert the end of it into a swaging tool, activate the swaging tool to accomplish the swaging and then upon release of the swaging tool from the end of the tube, the tube is manually extracted and deposited into a receptacle.

One of the major problems encountered in such manual swaging operations is that the tubes themselves are seldom if ever straight. Almost always, they have a bend, bow or are otherwise crooked. It is extremely important that when a tube is to have the end thereof swaged, that the end be perfectly in alignment with the swaging tool to accomplish the desired swaging operation. The worker who is manually accomplishing the swaging must therefore use his senses to accurately align the end of the tube with the swaging tool. Such often becomes very difficult.

During the performance of the swaging operation while the tool is in engagement with the end of the tube, the tube must be allowed to move longitudinally so that the swaging tool can function properly. In some instances, in the prior art, attempts have been made to use high speed forming or swaging of tubes. In such apparatus the tubes are firmly clamped in position during the entire performance of the swaging operations. Such continuous and firm clamping precludes longitudinal movement of the tube during the swaging operation, thus often resulting in a defective product.

There is therefore a need for an apparatus which will automatically feed the tubes from a holding receptacle or bin onto a conveyor apparatus which then moves the tubes into position at a swaging station and after the swaging operation occurs, automatically moves the swaged tubes to a receptacle for the finished swaged product. Such apparatus must position the ends of the tubes or pipes so that they are perfectly aligned with the swaging tool, then allow the swaging tool to perform its operation after which the tool is retracted from the end of the tube and the tube is released and allowed to be moved by the conveyor apparatus to the desired receptacle.

SUMMARY OF THE INVENTION

An automatic swaging machine for swaging the ends of tubes which includes a bin for receiving a supply of unswaged tubes, means for conveying tubes from said receiving bin to a swaging station having a swaging tool, means for gripping the tube for positioning of the swaging tool into engagement with the tube for swaging the end thereof, means for releasing the gripping means during execution of the swaging operation, means for regripping the tube subsequent to the execution of the swaging operation to permit disengagement of the swaging tool from the tube and means for disposition of the swaged tube into a collection bin.

The invention also includes the method of providing a swaging tool, moving a tube to be swaged into position adjacent the swaging tool, gripping the tube to preclude longitudinal movement thereof, engaging the swaging tool with the tube, releasing the tube, swaging the tube, regripping the tube, disengaging the swaging tool from the tube, and moving the swaged tube away from the swaging tool.

DETAILED DESCRIPTION

The present invention includes an automatic tube swaging machine which includes a tube feeding receptacle bin or hopper which contains a plurality of tubes, the ends of which are to be swaged in a manner to preform the tubes for use in particular applications for which they are intended. The tubes are fed from the bin onto a conveyor system which includes a plurality of upwardly extending members which move each of the tubes along the system until it reaches the swaging station. At least two tubes are swaged simultaneously at the swaging station. When the tubes reach the swaging station, they are caused to drop into a V shaped support which is aligned with the swaging tool thus causing the end of the tube to be perfectly aligned with the swaging tool. Once the tubes are in position in the V shaped support, a clamping mechanism is activated to hold the ends of the tubes in perfectly straight alignment with the swaging tool until such a time as the swaging tool engages the ends of the tubes. At this point, the clamps are released to allow the tubes to move slightly longitudinally during the swaging operation to ensure that the swaging operation is accurately performed. Once the swaging operation is completed, the clamping mechanism is again activated to hold the tubes in position while the swaging tool is retracted. Means is positioned adjacent the swaging tool, such as a photodetector, to determine when the housing for the swaging tool has been retracted and is cleared from the ends of the tubes that have been swaged. When this is accomplished, the clamping mechanism is deactivated and removed and the tubes are then moved by the conveyor system from the swaging station to a receiving receptacle for appropriate disposition and later use.

Figure 1:
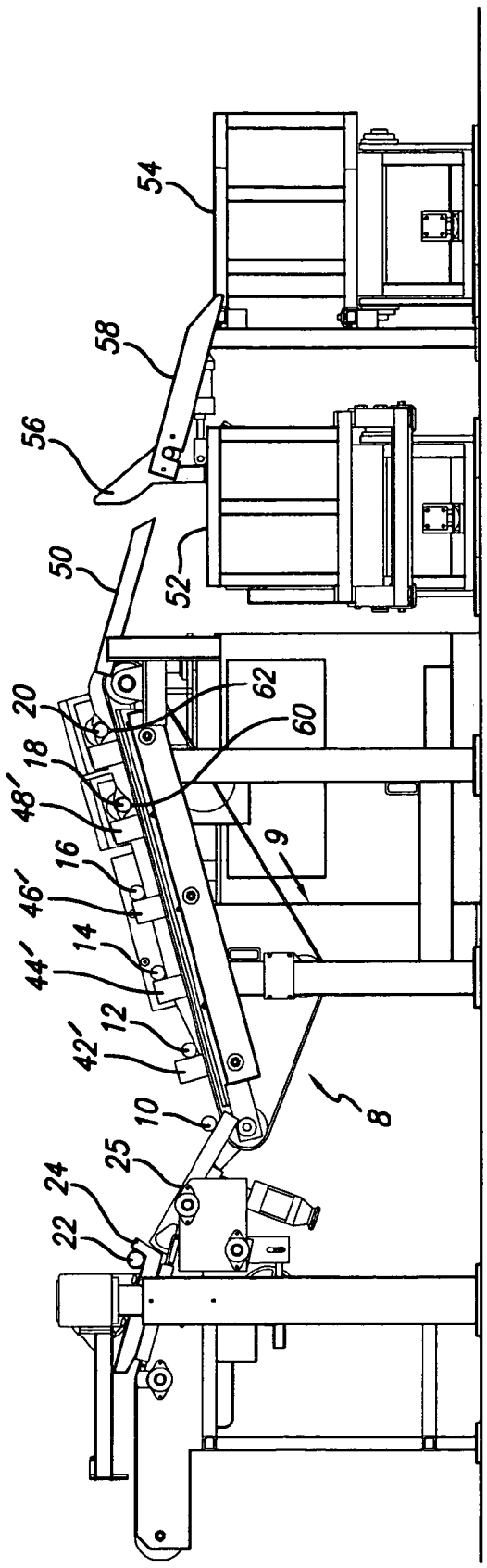
FIG. 1 is a side elevational view of an automatic swaging apparatus constructed in accordance with the principles of the present invention.
Figure 2:
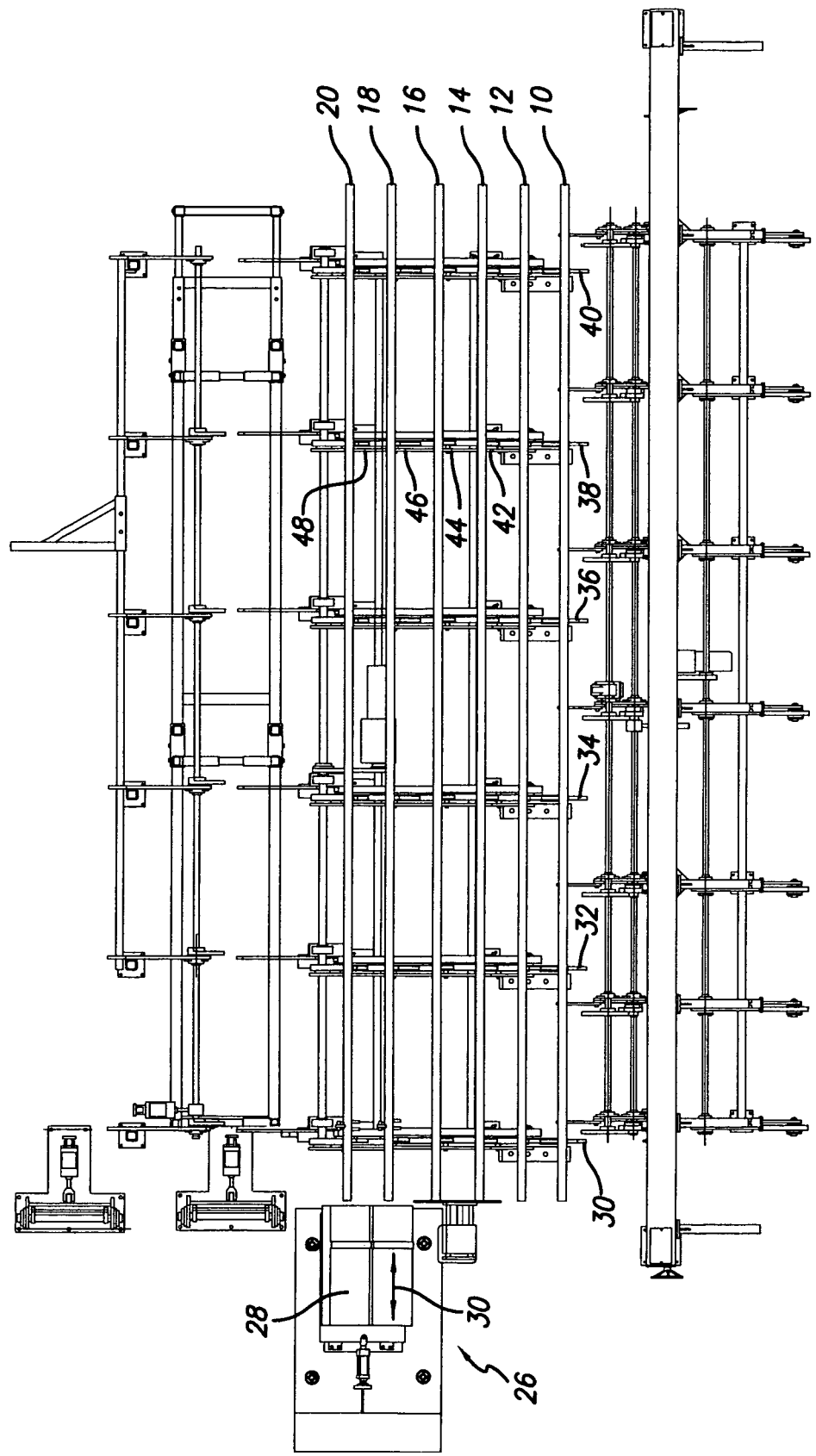
FIG. 2 is a top view of the apparatus as illustrated in FIG. 1.

Referring now more particularly to FIGS. 1 and 2, the automatic swaging machine of the present invention is schematically illustrated. The machine includes a conveyor system 8 which moves generally in the direction of the arrow 9 to cause a plurality of tubes 10 through 20 to be moved upwardly toward the swaging station 26. The tubes are initially dispensed within a receiving bin (not shown) where they are moved to a position as shown at 22 and held in place by an arm 24. The arm 24 will move downwardly from the position shown in FIG. 1 thus allowing the tube 22 to roll down the ramp 25 to a position such as shown by the tube 10. The conveyor system 8 is comprised of a plurality of driven chains as shown at 30 through 40 (FIG. 2). The driven chains 30 through 40 have disposed there-along at predetermined intervals a plurality of upwardly extending members or arms such as shown at 42 through 48 on the conveyor chain 38. Such arms are also illustrated at 42' through 48' in FIG. 1. These arms are spaced apart by the distance between the two swaging machines located at the swaging station 26. Although only the conveyor chain 38 is described as having the arms, it should be apparent to those skilled in the art that each of the chains is so equipped thus enabling each of the tubes to move in spaced relation along the conveyor system to the swaging station where they are appropriately swaged in the manner desired. When a proximity sensor determines that a tube is in position on the conveyor as shown at 10, the conveyor is activated to move the tubes. The conveyor is controlled by an incremental encoder to move the tubes so that the two tubes just swaged are moved one at a time away from the swaging station and into the receiving line. At the same time two unswaged tubes are moved incrementally (one at a time) onto the V supports 60 and 62 and in position at the swaging station. Subsequent to the swaging, the arms then convey the swaged tubes away from the swaging station and onto the ramp mechanism 50 to be deposited into a receiving bin 52 or 54. As will be evident to those skilled in the art, there is an interception arm 56 which when activated will cause the swaged tubes to be deposited into the receptacle 52 and when it is desired to have the tubes deposited into the receptacle 54, the interception arm will be in a retracted position, thus allowing the swaged tubes to move completely along the ramp 50-56-58 into the receiving receptacle 54.

When the tubes reach the swaging station, the ends thereof adjacent the swaging station drop into a V support mechanism as shown at 60 and 62. This mechanism causes the ends of the tubes to be appropriately aligned with the swaging tool to thus allow the swaging operation to properly occur. As is shown in FIG. 1, the tubes 18 and 20 are in position in the V supports 60 and 62. Once the tubes are in position on the V supports 60 and 62, a clamping mechanism (to be described in more detail below) is activated to hold the tubes in position while the swaging tool is positioned over the ends of the tubes 18 and 20 to accomplish the automatic swaging operation.

Figure 3:
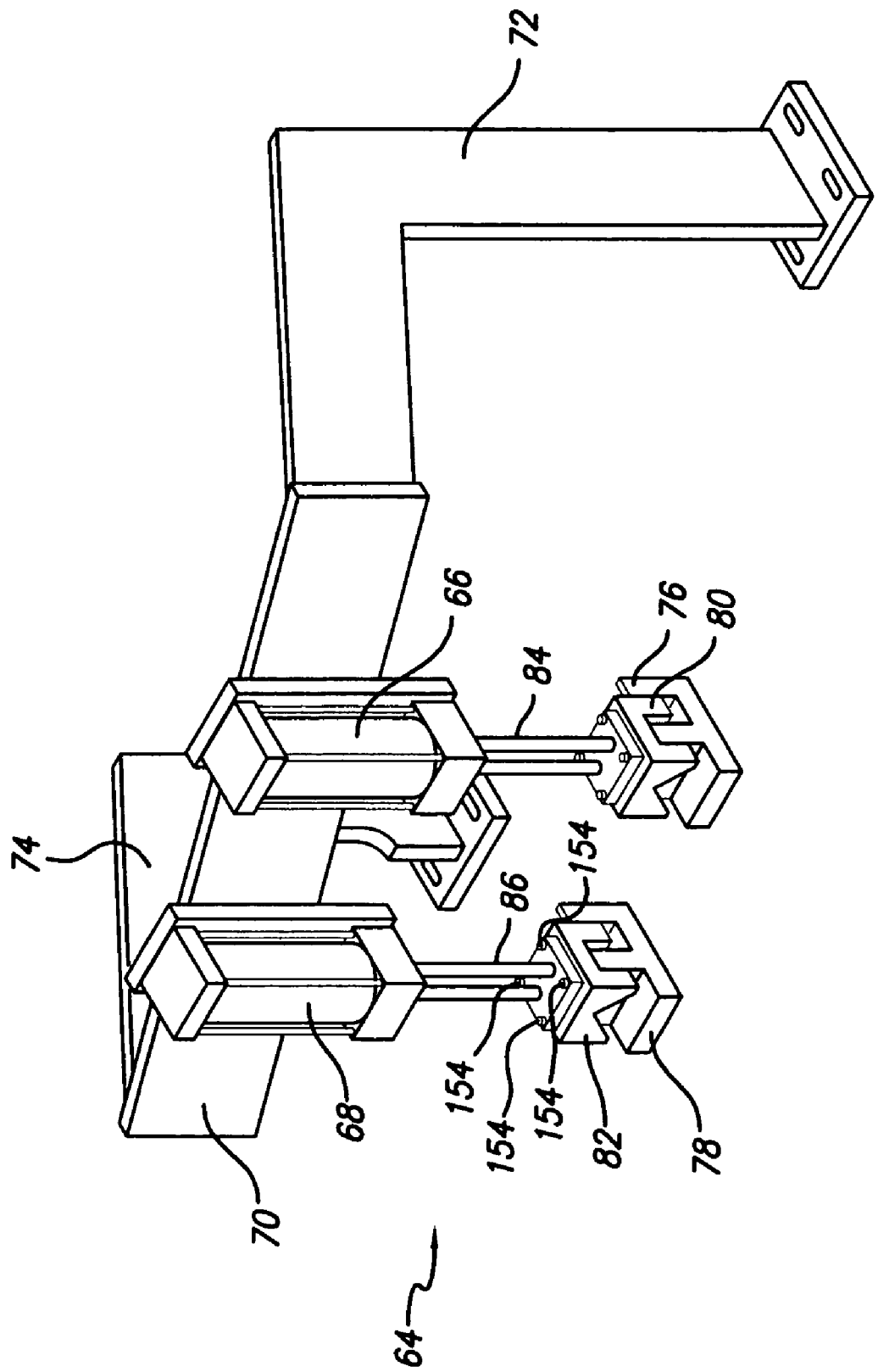
FIG. 3 is a perspective view of the clamping device used in accordance with the principles of the present invention.

Referring now more particularly to FIG. 3, the tube clamping assembly 64 is schematically illustrated. As is therein shown, a pair of dual acting master cylinders 66 and 68 are mounted upon a support frame 70 which in turn is supported by a pair of vertical support arms 72 and 74 which are in turn supported on the swaging machine frame adjacent the swaging station. A pair of V support blocks 76 and 78 are affixed on the conveyor frame adjacent the swaging station as shown at 60 and 62 in FIG. 1. A pair of V blocks 80 and 82 are connected to the cylinders 66 and 68, respectively by the piston rods 84 and 86. When the tubes, such as 18 and 20 are in position on the V support blocks 76 and 78, the cylinders 66 and 68 are activated to cause the V blocks to move downwardly and clamp the tube rigidly between the V blocks and the V support blocks 76 and 78 to allow the housing containing the swaging tools to move forward and surround the end of the tubes.

Figure 4:
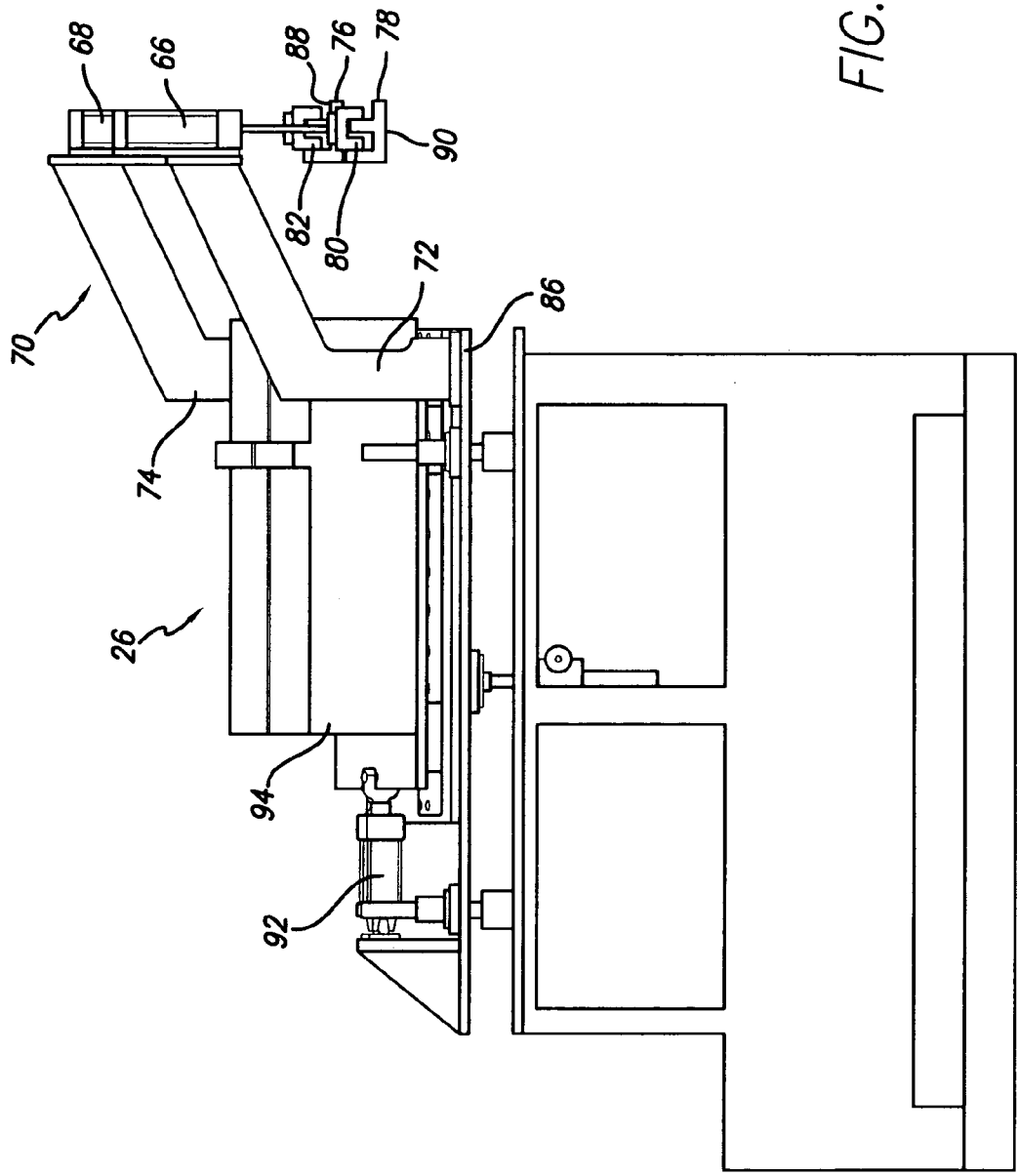
FIG. 4 is a side view thereof installed at the swaging station.
Figure 5:
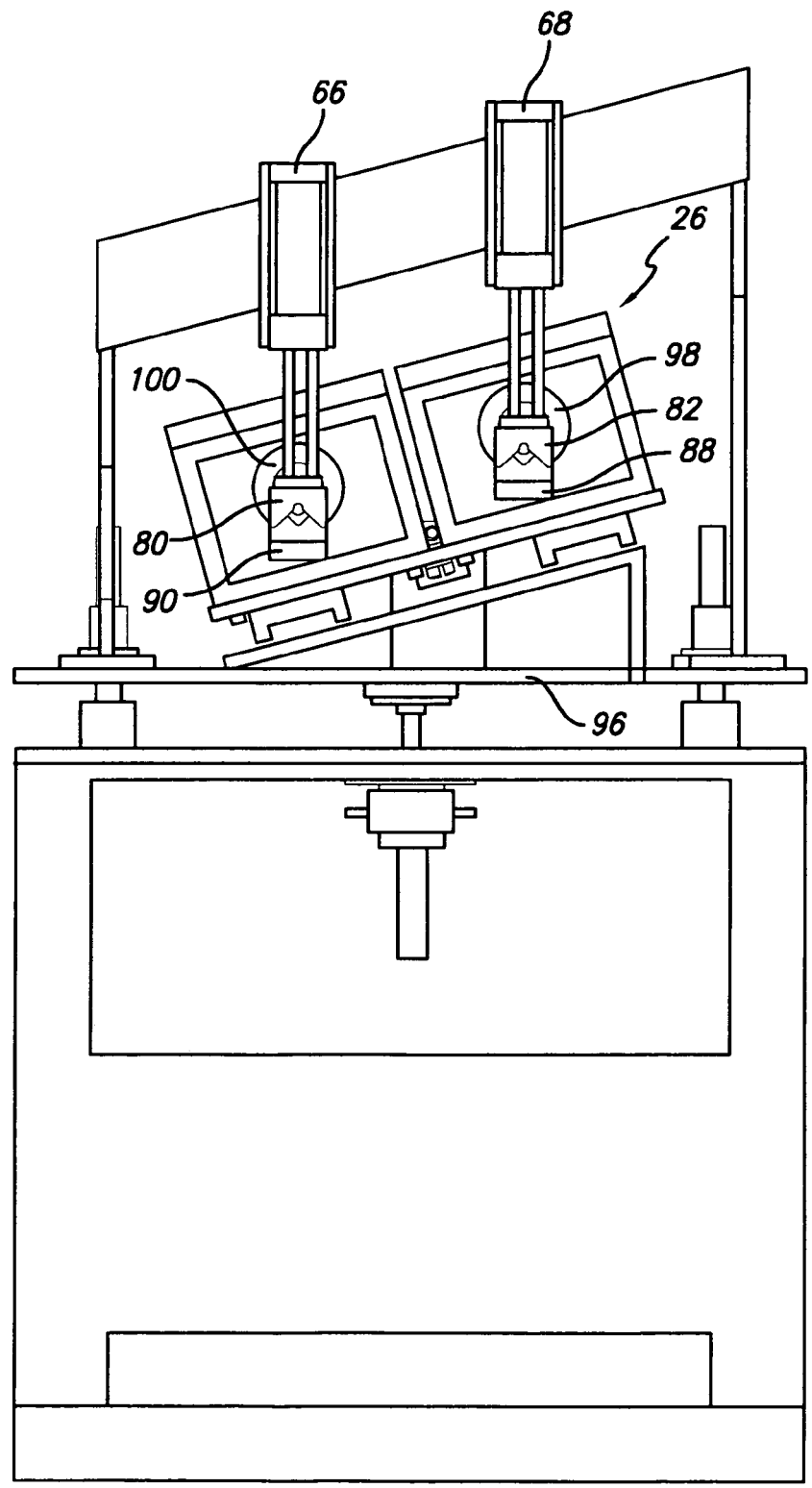
FIG. 5 is a front view thereof installed at the swaging station.
Figure 6:
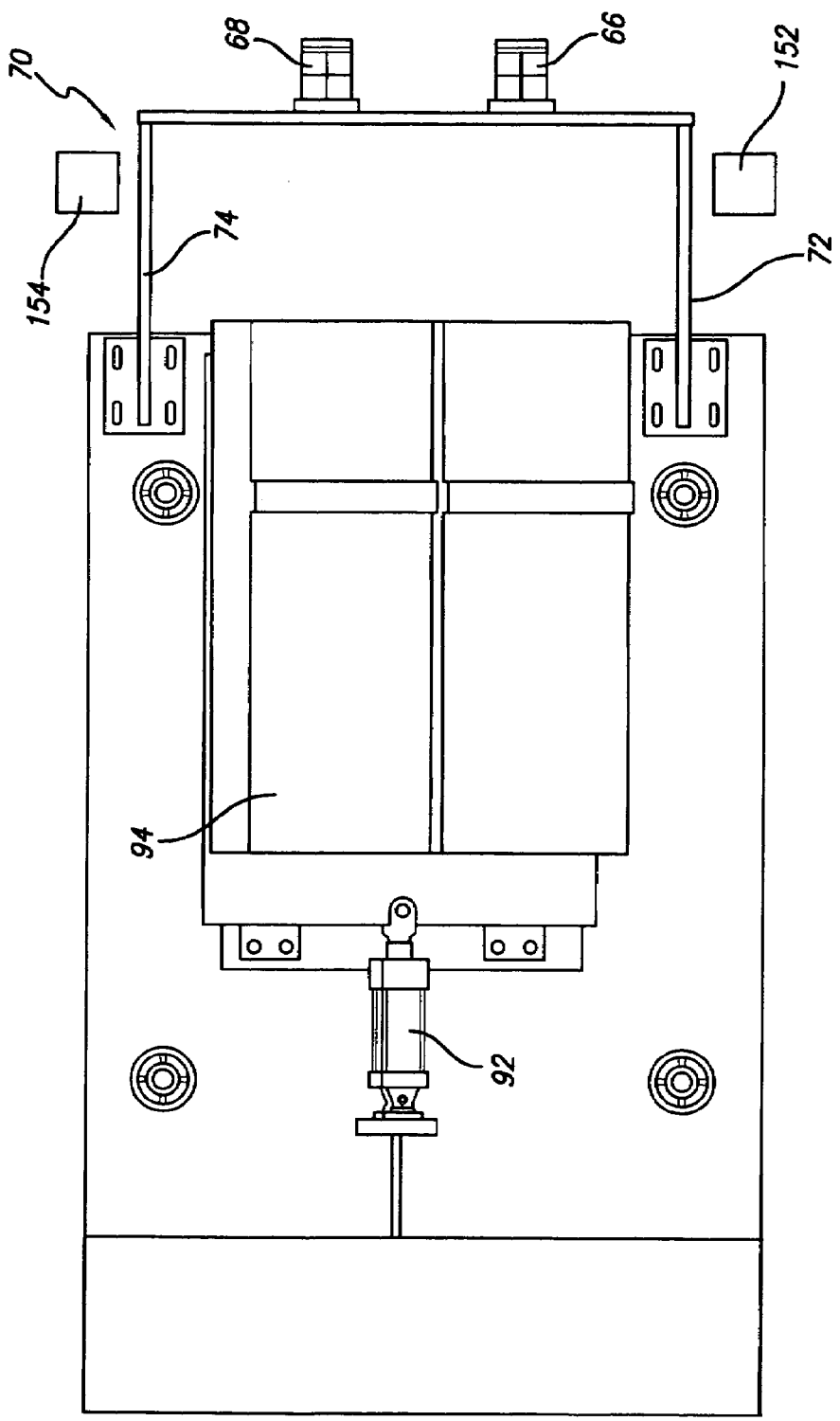
FIG. 6 is a top view thereof.

By reference now more particularly to FIGS. 4, 5, and 6, the arrangement of the clamping mechanism and the swaging station is illustrated schematically and in greater detail. As is therein shown, the support frame 70 for the master cylinders 66 and 68 is affixed to the frame 86 upon which the swaging station 26 is supported. The V support blocks 76 and 78 are affixed at their ends 88 and 90 respectively to the frame which supports the conveyor system as illustrated and described with respect to FIGS. 1 and 2. When the tubes are in place adjacent the swaging station and are resting in the V support blocks 76 and 78 the cylinders 66 and 68 are activated to propel the V blocks 80 and 82 downwardly to clamp the tubes in place. When such is done, a cylinder 92 is activated causing the swaging tool 94 to move to the right as viewed in FIG. 4. When the tool 94 moves to the right, it surrounds the ends of the tubes held in place by the clamping mechanism so that the ends of the tubes can be appropriately swaged according to the design for the application to which they are to be put. Before the swaging operation occurs the cylinders 66 and 68 are activated to retract the V clamping blocks 80 and 82. This is necessary to allow the tubes to move longitudinally as is required during the swaging operation.

When the swaging operation is completed, the cylinders 66 and 68 are again activated to propel the V clamping blocks 80 and 82 downwardly to again clamp the tubes in the V supports 76 and 78. While so clamped the cylinder 92 is activated to move the swaging tool 94 to the left as viewed in FIG. 4. Once the swaging tool has cleared the ends of the tubes (now swaged) the cylinders 66 and 68 are activated to retract the V clamping blocks 80 and 82. Thereafter, the swaged tubes are moved by the conveyor away from the swaging station and into the receiving bin.

As is seen more clearly in FIG. 5, the swaging station 26 is disposed at an angle by being supported upon the platform 96. The angle at which the swaging station 26 is disposed coincides with the angle at which the conveyor system moves the tubes as shown in FIG. 1. When the swaging tool 94 moves to the right as shown in FIG. 4, the openings as shown at 98 and 100 receive the ends of the tubes which are clamped between the supports 88 and 90 and the blocks 80 and 82 respectively.

Figure 7:
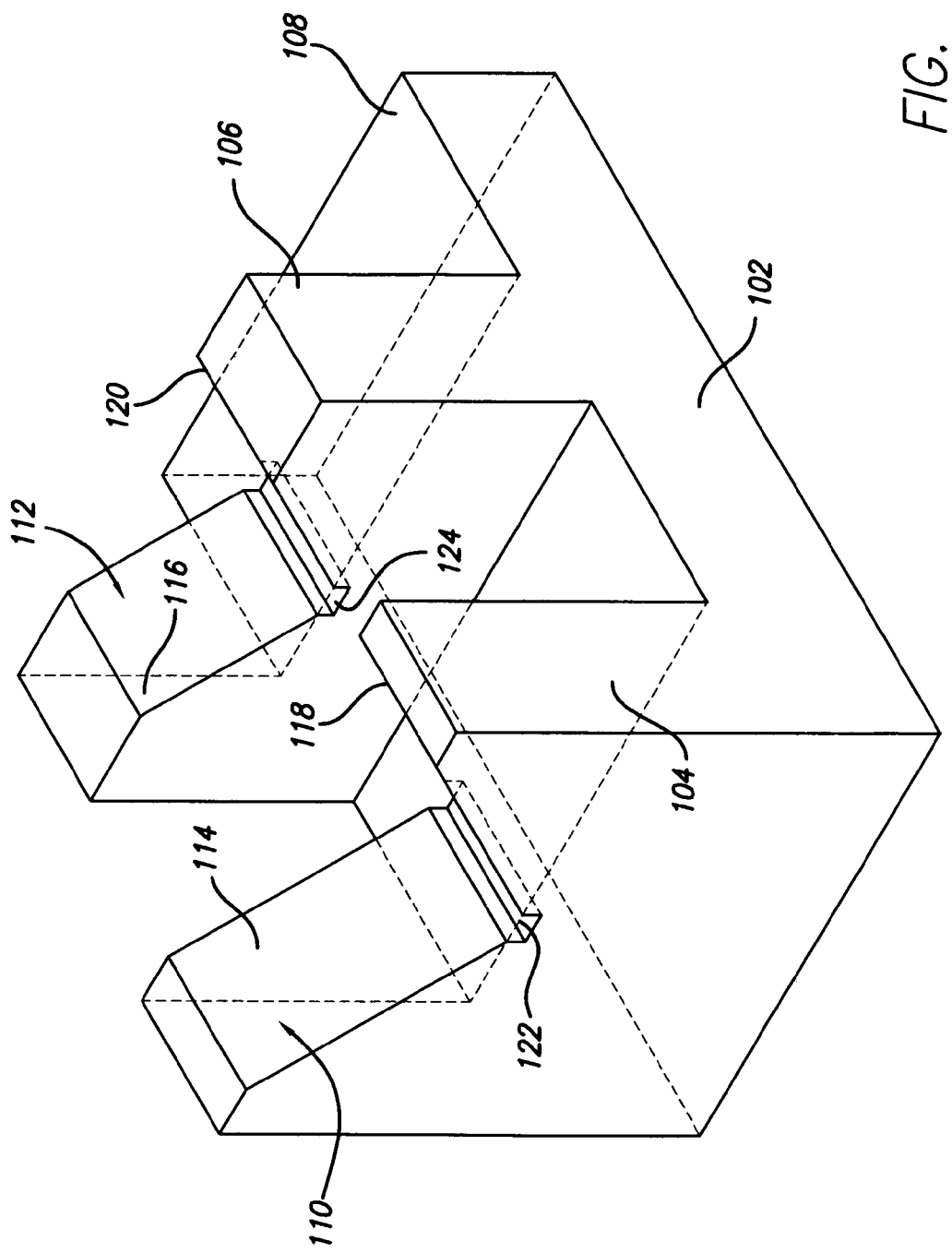
FIG. 7 is a perspective view of the V blocks used for receiving and positioning a tube in alignment with the swaging tool, in accordance with the principles of the present invention.
Figure 8:
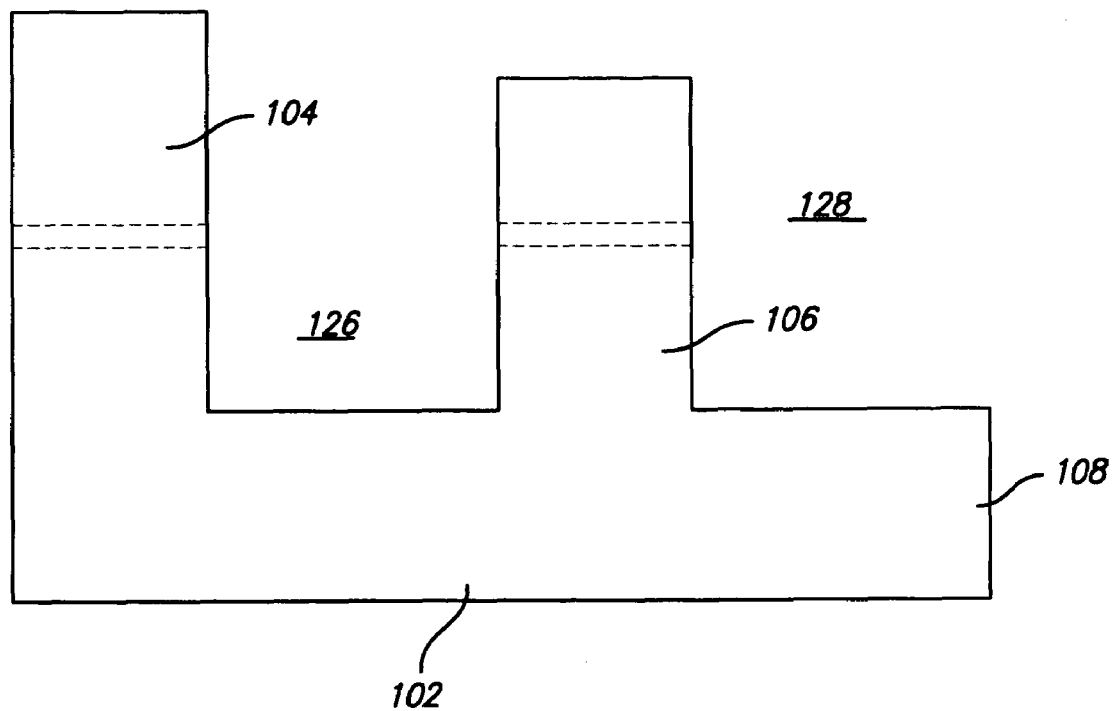
FIG. 8 is a side view of the V block.

By reference now more particularly to FIGS. 7 and 8 the V support blocks which position the tubes adjacent the swaging station as they traverse upwardly along the conveyor system are illustrated in greater detail. As is therein shown, the V support block is an F shaped member having a body 102 with arms 104 and 106 extending therefrom. The tail 108 of the body 102 is affixed to the conveyor system frame so as to be disposed at a position to cause the tubes to be properly disposed for being received within the openings in the two swaging tools. The tail 108 may be affixed to the frame by any means desired such as by fastening members, welding, clamps or the like. Each of the arms 104 and 106 are formed to define a V shaped opening 110 and 112 respectively by way of the cooperating slanting faces 114 and 118 and 116 and 120. At the apex of each of the V shaped openings is a groove 122 and 124 which provides a clearance for the circumference of the tube to be received. It should be noted that the arm 106 is slightly shorter than the arm 104. This difference is to permit the arms of the clamping block to be received within the spaces on each side of the arm 106 as shown at 126 and 128. This can be more readily seen by reference to FIG. 3.

Figure 9:
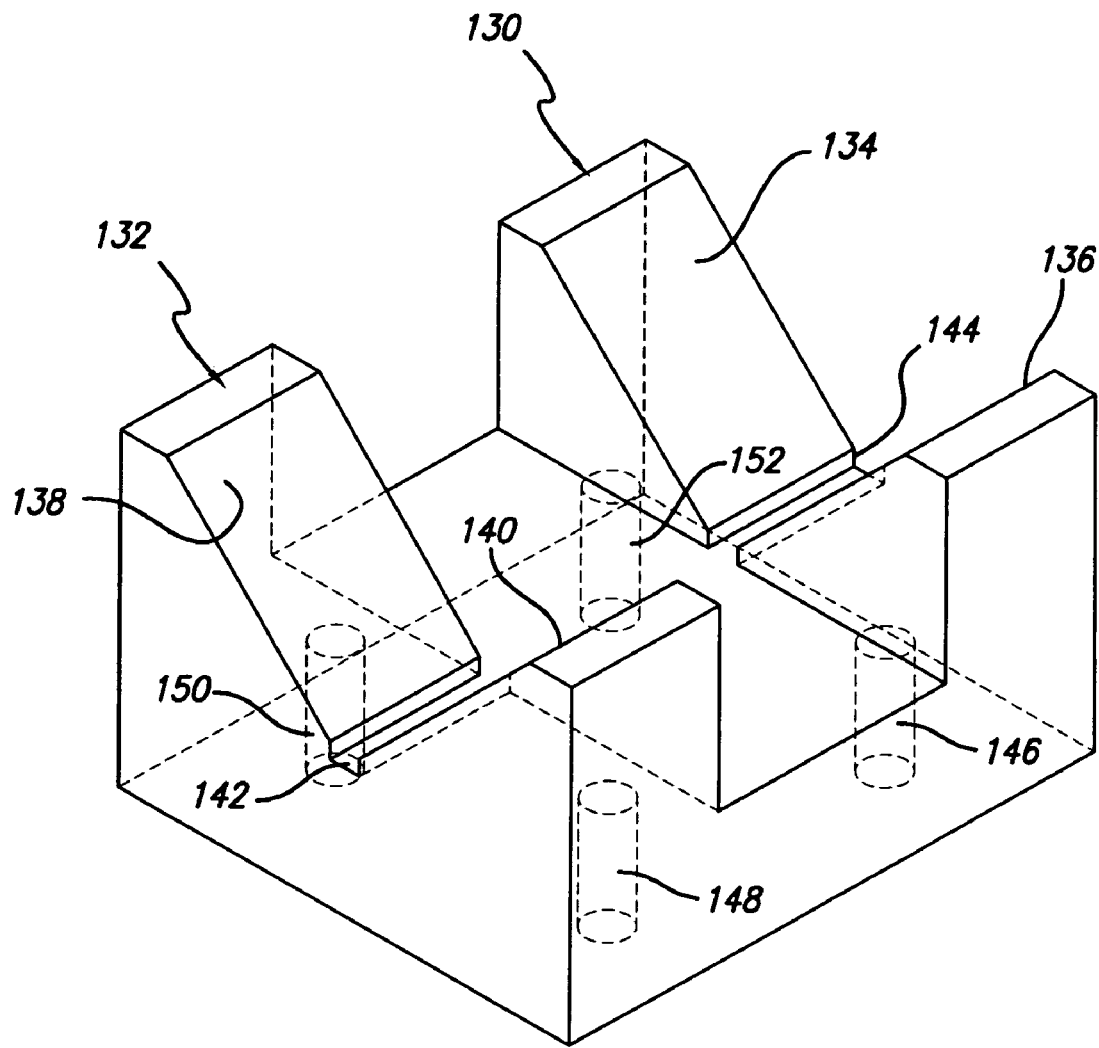
FIG. 9 is a perspective view of the clamping blocks which cooperate with the V blocks to clamp the tubes in position to accomplish the swaging operation by the swaging tool in accordance with the principles of the present invention.
Figure 10:
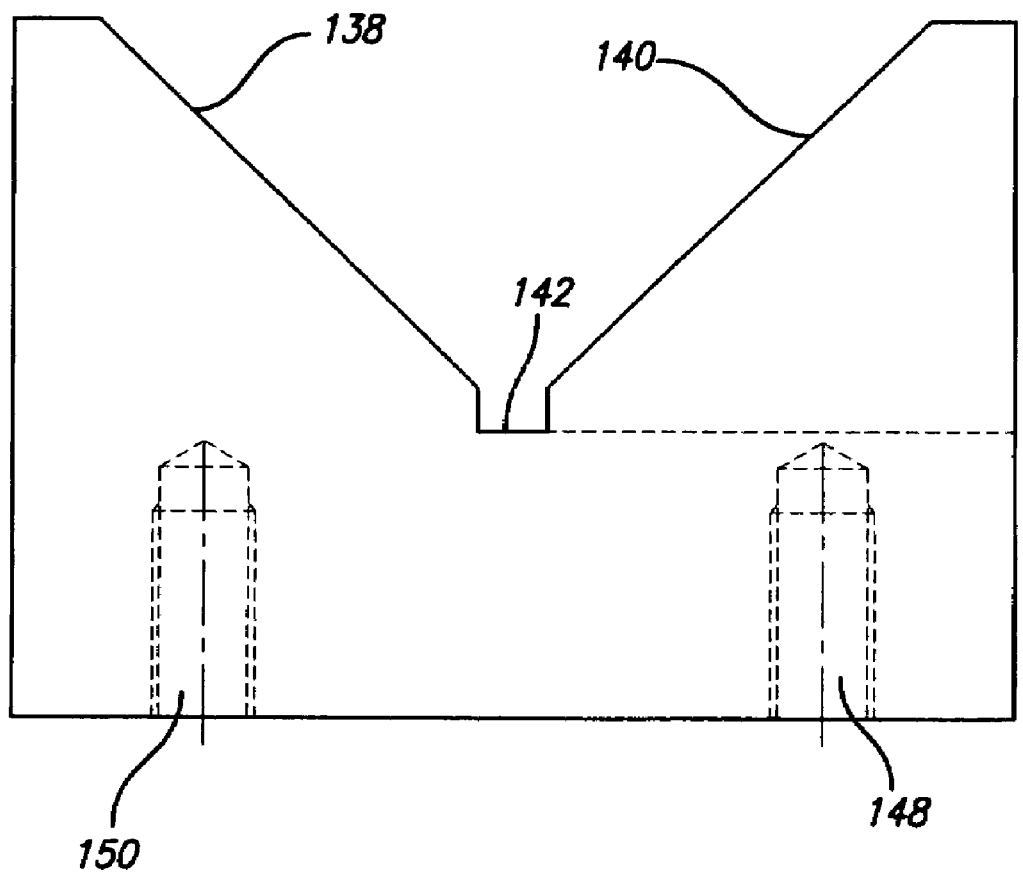
FIG. 10 is a side view of a clamping block.

By reference now more particularly to FIGS. 9 and 10, the construction of the V blocks which clamp the tube onto the support blocks is illustrated in greater detail. As can be seen, the clamping V blocks include a pair of arms 130 and 132 which also define a V shaped opening generated by the opposed slopping surfaces 134, 136, 138, and 140 which move downwardly as above described and clamp the tube between those surfaces and the V shaped surfaces of the support member. As is also illustrated, there is a groove at 144 at the apex between the surfaces 134 and 136 and a groove 142 at the apex between the surfaces 138 and 140. The grooves 142 and 144 are designed to receive the circumference of the tube which is being clamped into position. Threaded openings are defined at 146, 148, 150 and 152 in the arms 130 and 132. The threaded openings 146 through 152 receive appropriate fastening members as shown at 154 in FIG. 3 allowing the V clamping blocks to be affixed to the piston rod of the cylinders which move the clamping V blocks into position to clamp the tube to allow the movement of the swaging housing into position to accomplish the swaging and after the swaging to be removed from the end of the tube.

In operation of the automatic swaging machine of the present invention the tubes as shown at 10 through 20 in FIG. 1 are moved upwardly by the conveyor system and come into position adjacent the swaging station. As shown by the tubes 18 and 20, the tubes fall into the V shaped openings 110 and 112 of the V support blocks to thus be positioned in the proper alignment so that the ends of the tubes can be received in the openings 98 and 100 of the swaging tool 94. Before the swaging tool is moved into engagement with the tubes, the cylinders 66 and 68 are activated moving the clamping blocks downwardly to engage the upper surface of the tubes and to firmly clamp them in position. Such permits the swaging tool to move into a position surrounding the ends of the tubes. Once the swaging tool is in position the cylinders 66 and 68 are reactivated to retract the V clamping blocks. After the V clamping blocks are retracted the swaging tool then performs its swaging operating to preform the end of the tube in the desired manner. By having the clamping action retracted the tube is allowed to move longitudinally during the swaging operation so that the swaging operation may be properly performed. After the swaging operation is performed, the cylinders 66 and 68 are again activated moving the clamping blocks into engagement with the tubes to securely hold them between the clamping blocks and the V support blocks to allow the swaging tool housing to be retracted away from the end of the tubes. A sensing mechanism such as a photocell 152 and a source of light 154 (as shown in FIG. 6) is provided to sense that the swaging tool housing 94 has been properly retracted after which the swaged tubes are moved upwardly away from the swaging station and along the ramps 50, 56, 58 to be appropriately deposited in one of the receptacles 52 or 54 as above described. The photo cell 152 is a safety feature that prevents the conveyor from operating if the swaging housing is extended. The system is designed so that it operates continuously with the conveyor system moving two tubes into position for swaging, allow the swaging operation to occur as above described, moving the swaged tubes out of the swaging station area and then moving two additional tubes into position for swaging.

There has thus been disclosed an automatic swaging machine which maintains a plurality of tubes in perfectly aligned position to receive a swaging tool while the tubes are firmly clamped in position and to allow the swaging operation to occur after which the swaged tubes are automatically moved into a receiving bin or receptacle.

What is claimed is:

1. An automatic swaging machine for swaging the ends of tubes comprising:
   a bin for receiving a supply of unswaged tubes;
   means for conveying a tube from said receiving bin to a swaging station;
   a swaging tool;
   means for gripping said tube for positioning of said swaging tool into engagement with said tube for swaging thereof;
   means for releasing said means for gripping during execution of said swaying operation;
   means for regripping said tube subsequent to execution of said swaging operation to allow disengagement of said swaging tool from said tube; and
   means for disposition of a swaged tube into a collection bin.

2. An automatic swaging tool as defined in claim 1, which further includes means for aligning said tube with said swaging tool.

3. An automatic swaging tool as defined in claim 2, wherein said means for aligning includes a member defining a recess for receiving said tube.

4. An automatic swaging tool as defined in claim 3, wherein said means for gripping includes a clamp disposed, opposed said recess defining member, and means for moving said clamp toward and away from said tube.

5. An automatic swaging tool as defined in claim 3 wherein said member defining a recess is a support block having a pair of V shaped openings therein.

6. An automatic swaging tool as defined in claim 4 wherein said clamp is a block having a pair of V shaped openings therein.

7. An automatic swaging tool as defined in claim 1 wherein said means for gripping further includes a V support block disposed adjacent said swaging tool for receiving said tube in alignment with said swaging tool and a V clamping block disposed opposed said V support block and means for relatively moving said V clamping block and said V support block to clamp said tube there between.

8. An automatic swaging tool at defined in claim 7 wherein said means for relatively moving includes a cylinder and piston rod, said V clamping block being affixed to said piston rod.

9. An automatic swaging tool as defined in claim 1 wherein said means for conveying is a conveyor system having a plurality of upwardly extending arms for engaging a tube.

10. An automatic swaging tool as defined in claim 9 wherein said swaging tool includes two spaced apart swaging machines and said upstanding arms are spaced apart by a distance equal to the distance between the two swaging machines.

11. The method of swaging a tube comprising:
    providing a swaging tool;
    moving a tube to be swaged into position adjacent said swaging tool;
    gripping said tube to preclude longitudinal movement thereof;
    engaging said swaging tool with said tube;
    releasing said tube;
    swaging said tube;
    regripping said tube;
    disengaging said swaging tool from said tube; and
    moving said swaged tube away from said swaging tool.

12. The method of swaging a tube as defined in claim 11 which further includes aligning said tube with said swaging tool before gripping said tube.

13. The method of swaging a tube as defined in claim 12 which further includes moving said swaging tool into engagement with said tube before swaging said tube.

14. The method of swaging a tube as defined in claim 13 which further includes moving said swaging tool away from said tube after swaging said tube.

* * * * *